United States Patent

[11] 3,612,097

| [72] | Inventor | Darryll G. Prince |
| | | Norman, Okla. |
| [21] | Appl. No. | 767,075 |
| [22] | Filed | Oct. 14, 1968 |
| [45] | Patented | Oct. 12, 1971 |
| [73] | Assignee | K-F Prince Valve, Inc. |
| | | Oklahoma City, Okla. |

[54] CHECK VALVE
6 Claims, 4 Drawing Figs.

[52] U.S. Cl. .................................................. 137/527.4,
137/515.7, 251/363, 251/84
[51] Int. Cl. .................................................. F16k 15/03
[50] Field of Search .................................... 251/360,
362, 84, 85, 86, 87, 88, 367, 363; 137/527, 527.4,
515.5, 515.7

[56] References Cited
UNITED STATES PATENTS

| 2,263,750 | 11/1941 | Willke | 251/363 |
| 3,016,914 | 1/1962 | Keithahn | 137/527 |
| 3,022,978 | 2/1962 | Kowalski | 251/362 |
| 3,131,719 | 5/1964 | Englert | 251/362 |
| 3,172,424 | 3/1965 | Stillwagon | 137/527.4 |
| 3,395,727 | 8/1968 | Weise | 137/527 |
| 2,868,495 | 1/1959 | Lucas | 251/86 |

FOREIGN PATENTS

| 1,362,172 | 6/1963 | France | 137/527 |

*Primary Examiner*—Laverne D. Geiger
*Assistant Examiner*—William H. Wright
*Attorney*—Richards, Harris & Hubbard ABSTRACT: A wafer check valve is described having a generally cylindrical body with an axial length approximately one-third the diameter. A pivoted clapper assembly is spring biased against an annular seat disposed normal to the axis of the body to provide a fluid passageway of maximum diameter. The annular seat is formed by a noncorrosive seat ring which interferingly fit in the body. A resilient O-ring seal seals the joint between the seat ring and the body. In one embodiment, the seat ring includes a resilient seating surface. The clapper assembly includes a disk-shaped clapper loosely connected to a spring-biased pivot arm by a brad welded to the clapper.

PATENTED OCT 12 1971 3,612,097

INVENTOR
DARRYLL G. PRINCE

Richards, Harris & Hubbard
ATTORNEY

CHECK VALVE

BACKGROUND OF THE INVENTION

This invention relates generally to valves, and more particularly relates to an improved swinging-type check valve.

A multitude of different types of check valves have been used to pass fluid in one direction through a conduit and block fluid flow in another. A check valve should be reliable in operation, should be useful for controlling upward and downward as well as horizontal flow, and should be compact. The valve should result in a low-pressure drop. The valve should not chatter in operation and should close at zero flow, rather than slamming shut after flow reversal. The valve should have a long service life, should be easily repairable, and should be relatively simple and economical to construct.

Stem-guided piston-type check valves are often biased closed by a spring to prevent slamming after a flow reversal. However, these valves typically have a high-pressure drop due to the turbulence resulting from the spider supporting the stem and the fact that the valve member remains in the flow path. Further, these valves must be relatively large to accommodate this structure. Butterfly and split check valves may be made more compact than piston-type valves, but are usually found to be unreliable when handling fluids carrying sand or fibrous material. Swinging-type check valves have heretofore been generally large and bulky, and normally are useful only in horizontal runs. In addition, swinging check valves usually promote turbulence and result in somewhat high pressure drops.

SUMMARY OF INVENTION CLAIMED

This invention is concerned with an improved swinging-type check valve that is highly reliable, very compact, highly versatile, has a very low pressure drop, has a long service life, and is simple and relatively inexpensive to manufacture. The valve accomplishes these functions by the novel combination of several novel features.

In accordance with the broader aspects of this invention, a check valve is provided which has a generally cylindrical body with a pair of flat, parallel faces defining the length of the body which is substantially less than the diameter. An annular seat is formed around and normal to a fluid passageway extending longitudinally through the body. A disk-shaped valve member is supported by a pivoted arm which is spring biased to move the valve member against the annular seat.

In accordance with another aspect of the invention, the disk-shaped valve member is loosely connected to the pivoted arm by a headed brad pin which extends through an oversized aperture in the arm and through an aperture in the valve member. A weld mechanically connects the end of the brad pin and the upstream face of the valve member and provides a fluid seal between the two parts.

In accordance with a more specific aspect of the invention, the annular seat is formed on a seat ring which is interferingly fitted in a bore in the cylindrical body and a resilient O-ring seals the joint between the seat ring and the body. The seat ring is preferably stainless steel or other corrosion resistant material.

In accordance with still another aspect of the invention, the annular seating surface on the seat ring is formed by a resilient inset ring which is secured in an annular groove in the seat ring. The resilient inset ring has a maximum diameter greater than the maximum diameter of the valve member so that the resilient body will be deformed around the edge of the valve member by back pressure on the valve member to provide a fluid pressure enhanced seal. The press-fitted seat ring is preferably a corrosion-resistant material, thus preventing undercutting of the resilient seal.

BRIEF DESCRIPTION OF THE DRAWINGS

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

DESCRIPTION OF PREFERRED EMBODIMENTS

Figure 2:
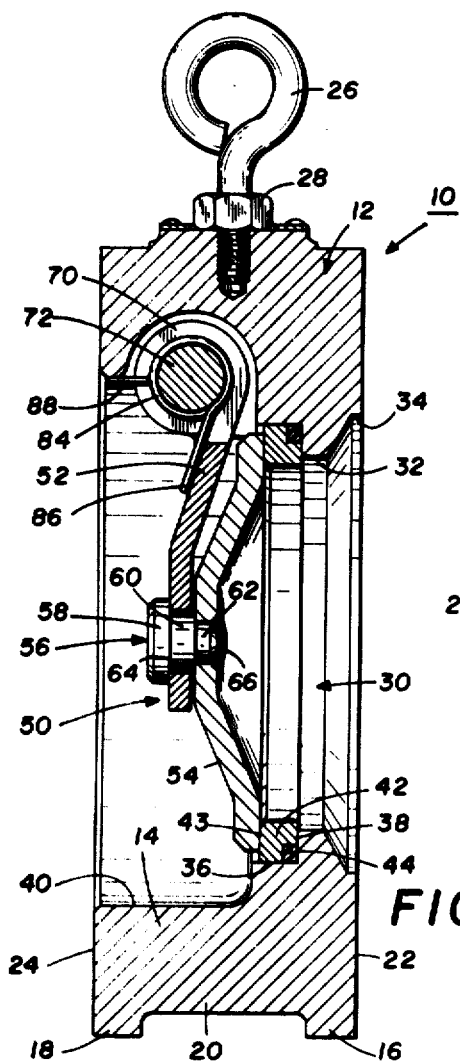
FIG. 2 is a sectional view taken substantially on lines 2—2 of FIG. 1.
Figure 1:
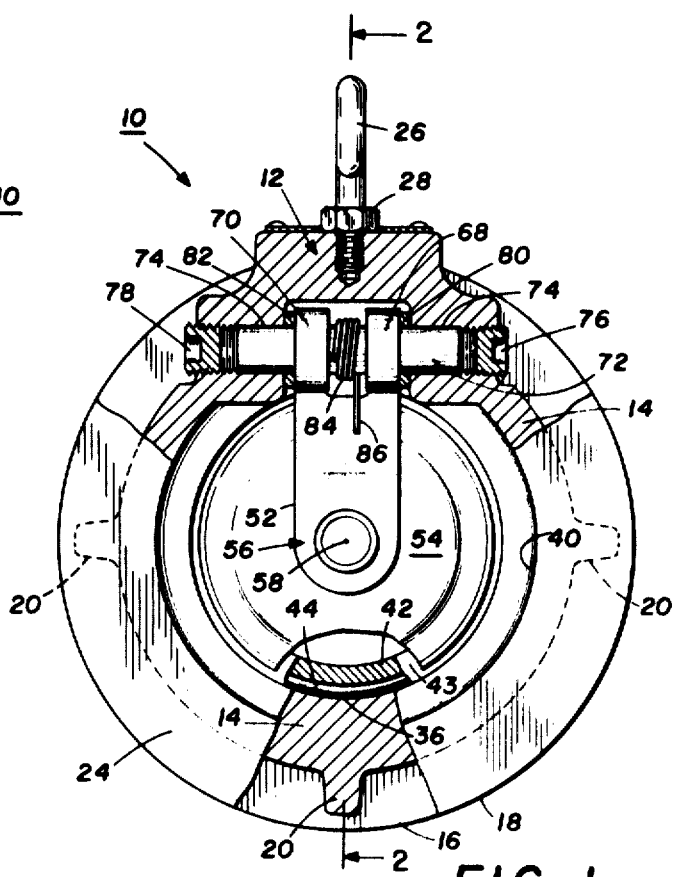
FIG. 1 is a downstream end view of a check valve in accordance with the present invention, partially broken away to reveal details of construction.

Referring now to the drawings, and in particular to FIGS. 1 and 2, a check valve constructed in accordance with the present invention is indicated generally by the reference numeral 10. The check valve 10 is comprised of a cast and machined body, indicated generally by the reference numeral 12, having a generally cylindrical sleeve portion 14. A pair of annular flange portions 16 and 18 extend radially outwardly from the opposite ends of the sleeve portion and are reinforced by three circumferentially spaced, longitudinally extending web portions 20. The upstream and downstream faces of the flanges 16 and 18 are machine to provide flat, parallel faces 22 and 24 which define the axial length of the valve.

The valve 10 is connected into a fluid conduit by positioning the flat surfaces 22 and 24 between a pair of resilient gaskets (not illustrated) and between a pair of conventional bolted pipe flanges (not illustrated). The flanges are then bolted together by bolts (not illustrated) disposed around the periphery of the body 12. The valve 10 may be conveniently lowered into position between the flanges by an eyebolt 26 which is threaded into the body 12 and secured against loosening by a lock nut 28. The outside diameter of the flanges 16 and 18 are sized to be closely received within the bolt circle of conventional bolted pipe flanges. Thus, the valve may be lowered between the pipe flanges until it rests on the lower bolts in the circle. This procedure accurately positions the valve in the line. Then the upper flange bolts may be inserted and all the bolts tightened to complete the assembly. The webs 20 reinforce the flanges to reduce breakage which might otherwise result from nonuniformly tightening the bolts.

A fluid passageway, indicated generally by the reference numeral 30, extends along the longitudinal axis of the body 12 and is aligned with the conduit in which the valve is connected. The fluid passageway 30 has a minimum diameter at bore 32. The passageway tapers outwardly to a diameter at 34 corresponding to the nominal inside diameter of the fluid conduit for which the valve is designed. A counterbore 36 extends from the downstream side of the valve to form an annular shoulder having a radially extending face 38. The passageway 30 then has a substantially increased diameter 40 to assist in maintaining the necessary cross-sectional area when the valve is open to keep the pressure drop across the valve at a low value.

A seat ring 42 is press fitted in the counterbore 36 which frictionally retains the ring against the shoulder 38. A flat, annular seating surface 43 is formed on the downstream end of the seat ring 42. A resilient O-ring seal 44 is disposed between the seat ring 42 and the body 12 to provide an annular fluid seal to prevent fluid undercutting of the ring 42 at high back pressures. The downstream face of the seat ring 42 is machined flat to provide an annular seating surface disposed normal to the axis of the body 12. The seat ring 42 is preferably stainless steel, or some other corrosion resistant material.

A clapper assembly, indicated generally by the reference numeral 50, is comprised of an arm 52, a dished, disk-shaped valve 54, and a rivet 56. These three components are preferably made from stainless steel or some other corrosion resistant material. The rivet 56 has an enlarged head portion 58, a shank portion 60 and a pin portion 62, each of progressively smaller diameter. The shank portion 60 extends through an aperture 64 in the end of the arm 52 that is of greater diameter than the shank portion 60, but smaller in diameter than the head portion 58. The pin portion 62 extends into an aperture in the disk-shaped valve 54 with the end of the shank portion 60 abutting the downstream face of the valve 54. The pin portion 62 has a length approximately equal to the thickness of the valve portion 54, and the end of the pin portion is beveled to provide an annular weld groove. The upstream end of the pin portion 62 is mechanically connected to the valve 54 by a weld 66 which also provides a fluidtight connection with no projections extending into the fluid stream when the valve is open. The shank portion 60 has a length slightly greater than the thickness of the arm 52 so that the head portion 58 is spaced from the valve member 54 a distance sufficient to permit the valve member 54 to have at least limited movement about all three axes relative to the arm 52.

The arm 52 has a pair of tines 68 and 70 which are curled and welded into complete loops which are received in a recess in the body. A pivot pin 72 passes through the loops formed by the tines 68 and 70 and is supported in bores 74 which extend through a pair of bosses formed in the body 12 on each side of the recess. The ends of the bores 74 are closed by a pair of threaded plugs 76 and 78. The arm 52 pivots about the pin 72 and is centered in the recess by a pair of thrust bushings 80 and 82 disposed between the tines 68 and 70 and the housing 12.

A coil spring 84 is disposed around the pivot pin 72 and has ends 86 and 88 which engage the arm 52 and the housing body 12, respectively, and bias the arm 52 toward the seat ring 42 to seat the valve 54 on the annular seating surface 43.

Under normal flow conditions, the clapper assembly is pivoted away from the seat ring 42 and into the passageway of the downstream pipe flange. The valve member 54 and rivet 56 are dimensioned such that both contact the curvature of the conduit through the flange at approximately the same point of travel. In this full open position, there is minimum restriction to fluid flow. The passageway through the valve is essentially straight and aligned with the piping. The disposition of the seat ring 42, which of necessity must be the most constructed part of the valve, normal to the axis of the fluid stream provides maximum effective cross-sectional area for a given diameter. This cross-sectional area is approximately equal to the cross-sectional area of the passageway around the clapper assembly when the valve member is in the full open position. Since the upstream face of the valve member 54 is substantially smooth, turbulence is materially reduced. Even more importantly, there are no projections which might catch foreign material entrained in the fluid stream which might prevent the valve from closing.

As the rate of fluid flow decreases, the spring 84 moves the arm 52 and thus valve member 54 toward the seat ring 42. At zero flow rate, the valve closes silently. Since the valve is biased closed prior to flow reversal, the valve can never be slammed shut by reverse fluid flow. The loose connection between the valve member 54 and the arm 52 insures a proper seating, and permits continuous relative movement between the valve member and the seating surface on the seat ring 42 to keep the two mating surfaces clean.

It will be noted that the valve 10 has a very short axial length when compared to the overall diameter of the body 12, and particularly when compared with the diameter of the standard sized pipe flanges. This ratio decreases favorably with an increase in the diameter of the conduit. This desirably small ratio is made possible by disposing the seat ring 42 normal to the axis of the valve to obtain minimum pressure drop, by using an interference press fit to secure the seat ring 42 in the body 12, thus eliminating any fasteners, and by using a spring to bias the valve closed when it would not otherwise close by gravity. The spring-biased clapper assembly also materially increases the versatility of the valve in that the valve can be used in both horizontal and vertical runs, including both upward and downward flow.

It will be noted that the valve 10 is relatively simple and can be manufactured relatively economically. The valve body 12 may be cast in its basic form, then bore 32, counterbore 36 and surfaces 22 and 24 machined. The seat ring 42, the arm 52, the valve member 54 and the rivet 56 may all be formed and stamped from stainless steel or other corrosion-resistant material. The seat ring 42 and valve member 54 are then machined to provide the seating surfaces and the groove for receiving the O-ring 44. The clapper is assembled merely by welding the end of the rivet 56 to the valve member 54. The O-ring 44 may then be placed in position in the counterbore 36, then the seat ring 42 pressed into the counterbore 36. The clapper assembly 50 may be pivotally connected in the housing 12 merely by aligning the looped tines 68 and 70, the bushings 80 and 82 and the coil spring 84 before inserting the pivot pin 72. The plugs 76 and 78 may then be threaded in place to retain the pin 72 and also provide fluidtight seals at the ends of the bores 74.

The clapper assembly can be replaced merely by removing the plugs 76 and 78 and driving the pin 72 out of the bore 74. Seat ring 42, which is frictionally retained within the counterbore 36, can be replaced by driving the seat ring 42 out of the counterbore 36. This can be accomplished by reason of the fact that the inside diameter of the seat ring 42 is slightly less than the diameter of the bore 32, thus providing an annular shoulder facing the upstream end which can be engaged by a punch or other suitable tool. Another seat ring of the same size can then be forced into the counterbore 36. There is no danger of leakage because of the O-ring seal 44.

Figure 3:
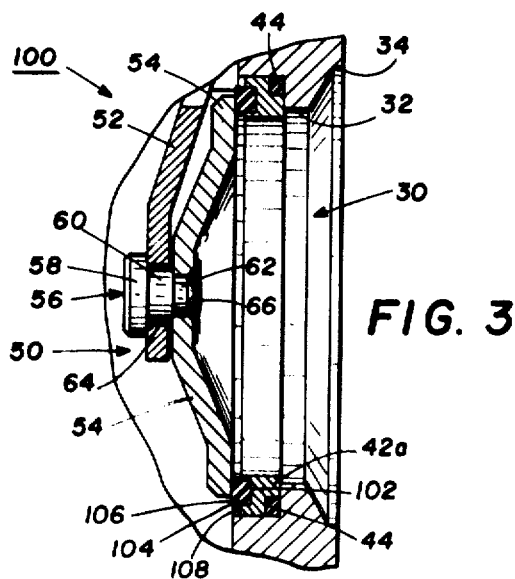
FIG. 3 is a partial longitudinal sectional view of an alternative embodiment of the present invention.
Figure 4:
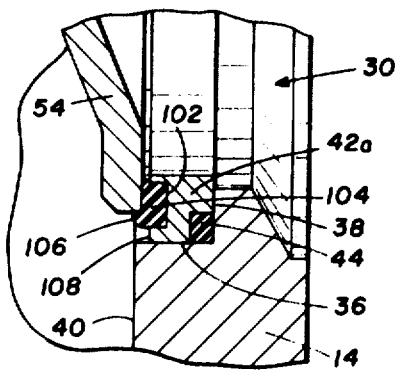
FIG. 4 is a partial longitudinal sectional view of the embodiment of FIG. 3 when subjected to back pressure.

Another embodiment of the invention is indicated generally by the reference numeral 100 in FIGS. 3 and 4. The valve 100 is substantially identical to the valve 10 and corresponding parts are therefore designated by the same reference numerals. Only the seat ring 42 of the valve 10 has been modified and the modified seat ring is indicated by the reference numeral 42a in FIGS. 3 and 4. A groove 102 is machined in the downstream face of the seat ring 42a and an annular resilient synthetic rubber seat 104 thermally bonded in the annular groove 102. The resilient seat 104 has a flat seating surface 106 which is offset from the face 108 of the seat ring 42a by a distance approximately equal to the depth of the groove 102. The resilient seat 104 has an outside diameter greater than the outside diameter of the valve member 54 so that the perimeter of the valve member 54 extends to a point about two-thirds of the distance between the inside diameter and the outside diameter of the seating surface 106.

When the valve member 54 in the valve 100 is loaded with a back pressure, the resilient seat 104 deforms substantially as illustrated in FIG. 4 so that the resilient material forms a good fluidtight seal with not only the upstream face of the valve member 54, but also the corner and edge of the valve member. Also, as the fluid pressure acts on the exposed surface of the resilient ring 104, the resilient material tends to flow and conform to the upstream face of the valve member 54 to assure a good fluidtight seal which is enhanced as the pressure is increased. Placing the resilient ring 104 in the annular groove 102 insures that the resilient ring will be securely held in place. Further, a fluidtight seal is provided for most working pressures even after the surface of the resilient ring 104 has been worn to the extent that the metal valve member 54 engages the metal seat ring 42a, because the fluid pressure acting on the exposed surface of the resilient material continues to flow the resilient material into contact with the seating surface of the valve member.

Although preferred embodiments of the invention have been described in detail, it is to be understood that various changes, substitutions and alterations can be made therein without departing from the spirit and scope of the invention as defined by the appended claims.

1. The check valve comprising:

a generally cylindrical body having a pair of opposite end faces for disposition between a pair of flanges in a fluid conduit, the upstream and downstream end faces defining the axial length of the body which is substantially less than the diameter of the body, a fluid passageway extending axially through the body, a first annular seating surface formed around the fluid passageway in a plane generally normal to the axis of the body, an arm disposed in the fluid passageway and pivotally connected to the body for pivotal movement toward and away from the first annular seating surface, a disk-shaped valve member having a second annular seating surface adapted to sealingly engage the first annular seating surface, the valve member being connected to the free end of the arm and being movable alternately toward and away from the first annular seating surface as the arm is pivoted, spring means interacting between the arm and the body for biasing the second annular seating surface against the first annular seating surface in the absence of a fluid flow in a direction through the valve to force the valve member away from the first annular seating surface against the bias of the spring, the disk-shaped valve member being loosely connected to the free end of the arm by a rivet having a head portion and a pin portion, the pin portion extending through an aperture in the arm and substantially through an aperture in the valve member, the aperture in the arm being larger than the pin portion therein and smaller than the head portion of the rivet, and a weld mechanically connecting the end of the pin portion to the upstream end of the valve member and forming an annular fluid seal between the portion and the valve member.

2. The check valve defined in claim 1 further characterized by:

a counterbore to the fluid passageway forming an annular shoulder with a generally radially extending face disposed normal to the axis of the passageway and facing the downstream end of the body, a seat ring frictionally retained in the counterbore against the annular shoulder, the radially extending seating surface being formed on the seat ring, and a resilient O-ring seal disposed between the seat ring and the body and forming an annular seal therebetween.

3. The check valve defined in claim 2 wherein:

the generally cylindrical body includes a cylindrical sleeve portion having a recess in one side and a pair of boss portions formed on each side of the recess, and further characterized by a pivot pin supported in the boss portions and extending through the recess, and wherein the arm has a pair of spaced loops disposed around the pivot pin, and the spring means comprises a torsion spring disposed at least partially around the pivot pin between the spaced loops and engaging the body and the arm.

4. The check valve defined in claim 3 wherein the seat ring is further characterized by:

an annular groove in the face of the seat ring, and a resilient annular ring secured in the annular groove and projecting beyond the seat ring to provide the first annular seating surface.

5. The check valve defined in claim 4 further characterized by:

a radially outwardly extending flange portion at each end of the sleeve portion, the diameter of the flange portions being sized and shaped so as to center the body in predetermined relationship within the bolt circle of a pair of standard bolted pipe flanges.

6. In a check valve having a body with a fluid passageway extending therethrough and an annular seating surface formed around the fluid passageway, the improvement comprising:

an arm extending into the fluid passageway at a point downstream from the annular seat and pivotally connected to the body for pivotal movement away from the annular seating surface, the arm including an aperture at the free end centered on the axis of the annular seating surface when the arm is fully pivoted into the fluid passageway, a disk-shaped valve member disposed in the passageway upstream of the arm and downstream of the annular seating surface on the body having a central aperture and an annular seating surface on one face adapted to sealingly engage the annular seating surface in the body, a rivet extending through the apertures in the arm and the valve member having a head portion disposed downstream of the arm with a diameter larger than the aperture in the arm and spaced from the valve member by a distance greater than the thickness of the portion of the arm between the head portion and the valve member, and a weld mechanically interconnecting the upstream end of the rivet and the upstream face of the valve member and forming a fluid seal between the rivet and the valve member.